United States Patent [19]

Gentsu

[11] Patent Number: 5,118,457
[45] Date of Patent: Jun. 2, 1992

[54] COLORED ZIRCONIA CERAMICS AND PROCESS FOR PREPARATION THEREOF

[75] Inventor: Takuya Gentsu, Sendai, Japan

[73] Assignee: Kyocera Corporation, Kyoto, Japan

[21] Appl. No.: 674,668

[22] Filed: Mar. 25, 1991

Related U.S. Application Data

[63] Continuation of Ser. No. 181,553, Apr. 14, 1988, Pat. No. 5,059,562.

[51] Int. Cl.⁵ .................. C04B 35/48; C04B 35/56
[52] U.S. Cl. ............................................ 264/65; 501/87
[58] Field of Search .................... 501/86, 87; 264/65, 264/66

[56] References Cited

U.S. PATENT DOCUMENTS 4,656,145 4/1987 Soroi ................................. 501/86
4,774,041 9/1988 Tsukuma et al. ..................... 264/66

FOREIGN PATENT DOCUMENTS 59-227770 12/1984 Japan .
63-37060 7/1988 Japan .

*Primary Examiner*—Mark L. Bell
*Assistant Examiner*—Deborah Jones
*Attorney, Agent, or Firm*—Spensley Horn Jubas & Lubitz

[57] ABSTRACT

Disclosed is colored, partially stabilized zirconia ceramics containing a colorant component and a stabilizer, wherein the zirconia ceramics contains 0.05 to 15% by weight of zirconium carbide based on the entire ceramics, the content of free carbon is lower than 0.1% by weight, and the crystal phase of the zirconia is composed of tetragonal crystals.

This colored, partially stabilized zirconia ceramics is prepared by a process comprising molding a composition comprising 0.1 to 10 parts by weight of a colorant component and 90 to 99.9 parts by weight of zirconia and a stabilizer into a molded body having a predetermined shape, sintering the molded body, and sintering the obtained sintered body in a carbon atmosphere to form ceramics containing 0.05 to 15% by weight of zirconium carbide, in which the crystal phase of zirconia is composed of tetragonal crystals.

5 Claims, No Drawings

COLORED ZIRCONIA CERAMICS AND PROCESS FOR PREPARATION THEREOF

This is a continuation of application Ser. No. 07/181,553, filed on Apr. 14, 1988, now U.S. Pat. No. 5,059,562.

BACKGROUND OF THE INVENTION

1. Field of the Invention

The present invention relates to an improvement in colored, partially stabilized zirconia ceramics. More particularly, the present invention relates to colored zirconia ceramics having an excellent iridescent hue and high strength and toughness, and a process for the preparation thereof.

2. Description of the Related Art

Recently, partially stabilized zirconia ceramics formed by incorporating a predetermined amount of a stabilizer into zirconia ceramics has attracted attention, and since the ceramics has high strength and high toughness characteristics, it is expected that the ceramics will be widely used in various fields.

Furthermore, colored zirconia ceramics formed by incorporating a colorant into this ceramics or black zirconia ceramics formed by incorporating a colorant and carbon into this ceramics have been proposed.

The latter black zirconia ceramics is disclosed in Japanese Patent Application Laid-Open Specification No. 227770/84, and it is taught that the colorant used for this ceramics is (1) at least one metal selected from the group consisting of metals of the groups 4a, 5a and 6a of the periodic table and metals of the iron groups and/or an alloy thereof, (2) at least one member selected from the group consisting of carbides, borides, silicides and mutual solid solutions of metals of the groups 4a, 5a and 6a of the periodic table, or a combination of (1) and (2). By incorporating carbon and/or graphite into this colorant, sintering is promoted, and the black hue is easily controlled.

However, this black zirconia ceramics is defective in the following points. In the case where the colorant (1) is incorporated, since the metallic component is included in zirconia ceramics, conversion to cermet is caused, and sintering of zirconia per se is hindered and inherent characteristics of zirconia cannot be exerted. For example, high strength and high toughness characteristics cannot be obtained. In the case where the colorant (2) is incorporated, vacuum sintering is adopted but control of sintering is difficult in this sintering method. Namely, it is difficult to homogenize the atmosphere throughout the interior of one sintering furnace or to maintain identical sintering conditions in respective sintering furnaces, and therefore, color unevenness is brought about among lots of the obtained ceramics and a high strength or high toughness of the same level cannot be attained.

In the above-mentioned ceramics, by incorporating carbon and/or graphite in addition to the colorant, sintering is promoted and control of the black or dark hue is facilitated.

However, since such a carbon component is included in the starting material for incorporation of the carbon component, carbon is left unreacted in the sintered body or a porous sintered body is formed, with the result that degradation of the strength is caused and a mirror surface having a deep gloss is hardly obtained.

SUMMARY OF THE INVENTION

Under this background, the present invention has been completed. It is therefore a primary object of the present invention to provide colored zirconia ceramics in which desired coloration is possible without any color unevenness among lots.

Another object of the present invention is to provide colored zirconia ceramics having a smooth mirror surface having an iridescent deep gloss.

Still another object of the present invention is to provide colored zirconia ceramics in which coloration is attained without degradation of high strength and high toughness characteristics inherently possessed by partially stabilized zirconia ceramics.

A further object of the present invention is to provide a process for preparing colored zirconia ceramics as described above.

In accordance with one aspect of the present invention, there is provided colored, partially stabilized zirconia ceramics containing a colorant component and a stabilizer, wherein the zirconia ceramics contains 0.05 to 15% by weight, especially 0.2 to 15% by weight, of zirconium carbide based on the entire ceramics, the content of free carbon is lower than 0.1% by weight, and the crystal phase of the zirconia is composed of tetragonal crystals.

In accordance with another aspect of the present invention, there is provided a process for the preparation of colored, partially stabilized zirconia ceramics, which comprises molding a composition comprising 0.1 to 10 parts by weight of a colorant component and 90 to 99.9 parts by weight of zirconia and a stabilizer into a molded body having a predetermined shape, sintering the molded body, and sintering the obtained sintered body in a carbon atmosphere to form ceramics containing 0.05 to 15% by weight of zirconium carbide, in which the crystal phase of zirconia is composed of tetragonal crystals.

DETAILED DESCRIPTION OF THE PREFERRED EMBODIMENTS

The colored zirconia ceramics of the present invention is characterized in that a metal oxide and zirconium carbide are incorporated as the colorant component into partially stability zirconia ceramics (hereinafter referred to as "PSZ ceramics"), and that the basic hue is formed according to the kind of the selected metal oxide, the amount added thereof and the reduction product thereof and desired iridescent blackening or darkening is attained according to the content of zirconium carbide (ZrC).

This colored zirconia ceramics is PSZ ceramics composed of tetragonal crystals and characterized by high strength and high toughness. However, the characteristics tend to be degraded by incorporation of the metal oxide as the colorant component. This tendency is controlled by incorporating ZrC in a predetermined amount, whereby high strength and high toughness characteristics are maintained.

In the colored zirconia ceramics of the present invention, desired coloration and high strength and high toughness characteristics can be attained by incorporating predetermined amounts of a metal oxide and/or a reduction product thereof and ZrC as the colorant component into PSZ ceramics. It is sufficient if a metal oxide and/or a reduction product thereof is incorporated in an amount of 0.1 to 10% by weight as calculated as the metal oxide. If the amount of the metal oxide and/or the reduction product thereof is smaller than 0.1% by weight, desired coloration is insufficient and color unevenness is often caused. If the amount of the metal oxide and/or the reduction thereof is larger than 10% by weight, high strength and high toughness characteristics can hardly be obtained.

It is sufficient if ZrC is incorporated in an amount of 0.05 to 15% by weight. If the amount of ZrC is smaller than 0.05% by weight, desired blackening or darkening is not attained. If the amount of ZrC exceeds 15% by weight, high strength and high toughness characteristics are insufficient.

The colorant component is an oxide of an element of the group IVa, Va VIa, VIIa or VIIIa of the periodic table, and for example, there can be mentioned oxides of Cr, Co, Fe, Ti, Mn, V and Ni. These oxides may be reduced to oxides of a lower order, carbides or elementary metals by reduction in a reducing atmosphere containing carbon.

In the colored zirconia ceramics containing the above-mentioned components according to the present invention, by incorporating ZrC as a part of the colorant component, blackening or darkening of the color generated by the colorant component is caused, and desired coloration can be attained. For example, an iridescent or metallic hue can be obtained by incorporating NiO, CoO or the like and ZrC.

The present invention is further characterized in that by incorporation of a predetermined amount of ZrC as the blackening component into PSZ ceramics, desired blackening or darkening is attained in addition to the above-mentioned coloration and simultaneously, high strength and high toughness characteristics can be attained.

By incorporation of the colorant component into PSZ ceramics, high strength and high toughness characteristics tend to be degraded, and if ZrC is incorporated into PSZ ceramics, the amount incorporated of the colorant component can be reduced and desired coloration can be attained, and the above-mentioned tendency of degradation is prevented.

If predetermined amounts of ZrC and $ZrO_2$ are simultaneously present, the strength and toughness can be further increased, and deterioration of high strength and high toughness characteristics by incorporation of the colorant component can be compensated for.

The amount added of ZrC is set at up to 15% by weight, and the content of $ZrO_2$ is set at 75 to 99.7% by weight, though the content of $ZrO_2$ is changed according to the kind of the crystal phase. The presence of tetragonal crystals in $ZrO_2$ is indispensable for maintaining high strength and high toughness characteristics, and it is preferred that the occupancy ratio of tetragonal crystals in the whole crystal phase of $ZrO_2$ be at least 40 mole %, especially at least 80 mole %.

In the above-mentioned PSZ ceramics, free carbon is a component degrading high strength and high toughness characteristics. It is preferred that the content of free carbon be controlled to a level lower than 0.1% by weight.

When the strength and toughness of the colored zirconia ceramics having the above-mentioned composition according to the present invention were measured, it was confirmed that the colored zirconia ceramics of the present invention has such high strength and high toughness characteristics as a strength of about 130 kg/cm$^2$ and a toughness of about 15 MN/m$^{3/2}$.

The colored zirconia ceramics of the present invention has strength and toughness comparable to those of conventional known white PSZ ceramics and is uniformly colored by the colorant component and ZrC, and when the surface of the sintered body of this ceramics is polished, a mirror surface having a deep gloss can be formed.

The process for the preparation of the colored zirconia ceramics of the present invention will now be described.

In the process of the present invention, sintering is carried out in two stages. The first sintering is carried out for obtaining PSZ ceramics containing a metal oxide as the colorant component, and this PSZ ceramics is then subjected to the second sintering to impregnate the interior of the PSZ ceramics with the carbon component and form a reduction product of the metal oxide.

More specifically, at the sintering of the first stage (hereinafter referred to as "first sintering"), the starting material for $ZrO_2$, the metal oxide as the colorant component and the stabilizer are sufficiently and homogeneously mixed at a predetermined ratio, the mixture is press-molded to a predetermined shape, and the molded body is sintered at a temperature of 1200° to 1700° C., especially 1350° to 1600° C., to obtain a colored PSZ ceramics molded body.

The mixing ratio between the metal oxide and $ZrO_2$ is set so that the amount of the metal oxide is 0.1 to 10 parts by weight and the amount of $ZrO_2$ is 90 to 99.9 parts by weight.

If the amount of the metal oxide is smaller than 0.1 part by weight, desired coloration is hardly attained and color unevenness is often caused. If the amount of the metal oxide is larger than 10 parts by weight, high strength and high toughness characteristics are hardly attained. Furthermore, if the amount of $ZrO_2$ is smaller than 90 parts by weight, sintering becomes difficult and it is impossible to attain high strength and high toughness characteristics.

The metal oxide may be in the form of any of a powder, a liquid and a paste at the stage of the starting material. The average particle size of the metal oxide is smaller than 0.06 μm, preferably smaller than 0.03 μm. If the particle size of the metal oxide is within this range, in the case where the metal oxide is homogeneously dispersed in the starting material, the entire PSZ ceramics is uniformly colored and high strength and high toughness characteristics can be obtained.

The average particle size of the starting $ZrO_2$ is smaller than 0.15 μm, preferably 0.06 μm, and a substance that can be converted to $Zr_2O$ powder by sintering, for example, zirconium hydroxide, can be used as the starting material for $ZrO_2$. In the case where zirconium hydroxide ($ZrO_2.xH_2O$) is used, as the sintering temperature is high, the primary particle size of $ZrO_2$ powder is increased, and therefore, $ZrO_2$ powder having an average particle size of 0.02 to 0.1 μm is obtained by changing the sintering temperature within the range of from 900° to 1050° C.

Known stabilizers such as $Y_2O_3$, MgO, CaO and $CeO_2$ can be used in the present invention. These stabilizers are used singly or in combination in an amount necessary for effecting partial stabilization.

In the case where $Y_2O_3$ alone is incorporated, the amount is adjusted so that $Y_2O_3$ is contained in an amount of 2 to 7 mole % in the sintered body.

In the case where CaO or MgO is singly incorporated, the amount is adjusted so that CaO or MgO is contained in an amount of 8 to 11 mole % or 7 to 13 mole % in the sintered body.

It is preferred that the average particle size of the stabilizer be smaller than 2 μm, especially smaller than 1 μm. Co-precipitated $ZrO_2$ powder containing a predetermined amount of the stabilizer can also be used in the present invention. If this powder is used, there is attained a mixed state where the stabilizer and $ZrO_2$ are more densely and uniformly dispersed, and therefore, in view of uniformalization of the crystal grain size in the sintered body, use of this co-precipitated powder is preferred.

The colored zirconia ceramics of the present invention comprises $ZrO_2$, the metal oxide or metal oxide reduction product colorant component and the stabilizer as indispensable components, but inclusion of other components is not excluded in the present invention. For example, when a pulverizing medium of balls or the like is used for mixing and pulverizing zirconia, the stabilizer and the colorant component, a component constituting the pulverizing medium, for example, alumina ($Al_2O_3$), is inevitably incorporated during the mixing and pulverizing operation. Incorporation of such a component in an amount of up to 20% by weight based on the total ceramics is allowed in the present invention.

The sintering atmosphere adopted for the first sintering may be any of an oxidizing atmosphere, a vacuum atmosphere and a reducing atmosphere, and an oxidizing atmosphere is especially preferred. If the oxidizing atmosphere is adopted, sintering conditions can be easily set, and desired coloration can be attained without uneven coloration among lots.

Pressure sintering or pressureless sintering can be adopted for the first sintering, and hot press and HIP methods can be adopted as the pressure sintering method.

The colored ceramics molded body obtained by the first sintering is composed of PSZ ceramics containing the colorant component, and the strength and toughness tend to be degraded by the colorant component. However, by selecting a metal oxide among metal compounds and using it as the colorant component, the thermal decomposition is not caused by the sintering and uniform coloration can be attained without formation of voids in the sintered body.

The colored ceramics molded body obtained by the first sintering contains tetragonal crystals of $ZrO_2$, and it is preferred that the sintering conditions be set so that the content of tetragonal crystals is as high as possible. In the case where the content of $ZrO_2$ tetragonal crystals in entire $ZrO_2$ is at least about 60 mole %, preferably at least about 80 mole %, by the sintering of the second stage (hereinafter referred to as "second sintering"), high strength and high toughness characteristics can be advantageously attained.

A carbon-containing atmosphere is indispensable for the second sintering, and by using the carbon-containing atmosphere, the metal oxide in the colored PSZ ceramics molded body is reduced and ZrC is incorporated in a predetermined amount in the sintered body, with the result that the basic color hue can be desirably blackened or darkened. It is preferred that the second sintering be carried out at a temperature of 1100° to 1650° C., especially 1300° to 1550° C.

The reducing atmosphere sintering is performed according to a method in which the colored PSZ ceramics molded body is sintered in a non-oxidizing atmosphere in the state contacted with a carbon component such as carbon black (ordinarily called the embedded sintering method) or a method in which the ceramics is impregnated with a carbon component by carrying out HIP while arranging a carbon source in a HIP apparatus. These two sintering methods can be adopted in combination.

Various sintering methods can be adopted for the second sintering, so far as the sintering is carried out in a carbon-containing atmosphere. However, the HIP method is especially preferred for the second sintering because desired blackening or darkening is advantageously accomplished and high strength and high toughness characteristics can be maintained or improved.

According to the HIP method, a partition wall chamber for arranging the colored PSZ ceramics molded body therein is formed in the HIP apparatus, an inert gas (Ar, $N_2$ or the like) is introduced into the interior of the partition wall chamber to effect a desired degree of pressurization, and the molded body is heated to perform HIP sintering.

When the colored PSZ ceramics molded body is arranged in this partition wall chamber, there may be adopted a method in which the molded body is placed in a vessel formed of carbon and, if desired, the vessel is closed by a lid or the like, and then, the vessel is set in the interior of the partition wall chamber.

The carbon source for blackening or darkening the molded body is arranged in the interior of the above-mentioned vessel together with the molded body.

In the case where the sintering is carried out according to the HIP sintering method, in order to impregnate the interior of the molded body with carbon at a high efficiency, it is preferred that the pressure be adjusted to 1000 to 2000 atmospheres (gauge pressure) and the temperature be adjusted to 1400° to 1600° C.

By the second sintering, the colored zirconia ceramics molded body obtained by the first sintering is impregnated with carbon and the metal oxide is reduced, whereby desired coloration can be accomplished. The degree of coloration can be appropriately changed according to the degree of reduction of the metal oxide, and the metal oxide is partially or completely reduced according to the kind of the metal oxide and the sintering conditions.

Furthermore, by the second sintering, a part of $ZrO_2$ is reduced to ZrC, and if $ZrO_2$ and ZrC are co-present at a predetermined ratio, the strength and toughness can be increased.

Namely, it is preferred that ZrC be formed in an amount of 0.05 to 15% by weight based on the entire ceramics, and if the amount of ZrC is within this range, desired blackening or darkening is attained and high strength and high toughness characteristics can be imparted. If the sintering conditions are set so that the occupancy ratio of tetragonal crystals in the crystal phase of $ZrO_2$ is at least about 60 mole %, preferably at least about 80 mole %, high strength and high toughness characteristics are advantageously attained.

It sometimes happens that a minute amount of free carbon is left in the ceramics molded body by the carbon impregnation caused by the second sintering, but the amount of free carbon is much smaller than the amount of residual carbon observed when carbon is incorporated in the ceramics molded body.

When the surface of the colored PSZ ceramics molded body obtained by the second sintering is polished by a diamond wheel, a diamond powder, a diamond paste or the like, since the size of crystal grains of the molded body are uniform and small and voids are not substantially present in the molded body, a mirror surface having a deep gloss having an iridescent color or the like can be formed.

As is apparent from the foregoing description, according to the present invention, uniform coloration can be accomplished by the first sintering, and desired coloration and high strength and high toughness characteristics can be attained by the second sintering.

The present invention will now be described in detail with reference to the following examples that by no means limit the scope of the invention.

EXAMPLE 1

To 100 parts by weight of high-purity $ZrO_2$ powder were added 5.3 parts by weight of $Y_2O_3$ as the stabilizer and 2 parts by weight of oxides of Cr, Fe, Ti, Co and Ni as the colorant, and the mixture was wet-pulverized by using alumina balls and was then dried. The so-obtained starting powder was passed through a 120-mesh sieve and paraffin wax was added to the particle size-adjusted powder, and the mixture was passed through an 80-sieve mesh. The obtained powdery mixture was molded under a molding pressure of 1 ton/cm$^2$ to a size of 5 mm × 5 mm × 50 mm, and the binded was removed and the molded body was subjected to the first sintering in an oxidizing atmosphere at a sintering temperature of 1450° C. to obtain a colored zirconia ceramics molded body having a dense blue color.

In the so-obtained ceramics molded body, the content of $ZrO_2$ tetragonal crystals was about 80 mole % based on total $ZrO_2$, and when the strength and toughness of the ceramics molded body were measured, it was found that the strength and toughness were 95 kg/cm$^2$ and 12.1 MN/m$^{3/2}$, respectively.

Incidentally, the strength was determined according to the three-point bending test method of JIS R-1601, and the toughness was determined as the critical stress expansion coefficient observed when the ceramics was broken by the growth of microcracks according to the S.E.N.B. (single edge notched beam) method.

Then, the colored PSZ ceramics molded body was subjected to the second sintering according to the HIP method.

More specifically, the molded body and a carbon source (for example, carbon paper) were arranged in an HIP vessel formed of carbon and the vessel was closed by a lid, and the vessel was arranged in the interior of an HIP apparatus. The HIP treatment was carried out for 1 hour under a pressure of 2000 kg/cm$^2$ (gauge pressure) at a sintering temperature of 1475° C. by using Ar gas as the pressure medium.

The surface of the so-obtained ceramics molded body was more roughened than the surface before the HIP treatment.

Accordingly, the entire surface of the ceramics molded body was ground and polished in a thickness of 100 μm. A surface having an iridescent hue of a greenish blue color, as the base color, which had been blackened and darkened, and having a much reduced number of voids was obtained. When the crystal component of the obtained molded body was analyzed, it was found that the $ZrO_2$ content was about 95% by weight, the ZrO content was about 3% by weight and the free carbon content was about 0.01% by weight, and the amount of the coloring metal component was about 2% by weight as calculated as the oxide. It also was found that tetragonal crystals occupied 76 mole % of $ZrO_2$.

When the strength and toughness of the obtained ceramics molded body were measured, it was found that the strength was 125 kg/cm$^2$ and the toughness was 14.2 MN/m$^{3/2}$.

EXAMPLE 2

Ceramics molded bodies of samples 1 through 6 shown in Table 1 were prepared by adopting the same first and second sintering conditions as described in Example 1 while changing the amount incorporated of the metal oxide component as shown in Table 1. The obtained results are shown in Table 1.

TABLE 1

| Sample No. | Mixing Ratio (% by weight) of Metal Oxide/ Metal Oxide + $ZrO_2$ in Starting Material | content in Ceramics after Second Sintering | | Strength (kg/cm$^2$) | Toughness (MN/m$^{3/2}$) | Hue |
| | | ZrC (% by weight) | Ratio (mole %) of Tetragonal Crystals in $ZrO_2$ | | | |
| --- | --- | --- | --- | --- | --- | --- |
| 1* | 0.05 | 2.2 | 85 | 130 | 14.4 | light black |
| 2 | 1.5 | 2.5 | 80 | 130 | 14.2 | darkened and balckened greenish blue |
| 3 | 3 | 3.0 | 80 | 125 | 14.0 | darkened and balckened greenish blue |
| 4 | 5 | 2.6 | 70 | 118 | 13.3 | darkened and balckened greenish blue |
| 5 | 9 | 2.3 | 63 | 100 | 11.5 | darkened and balckened greenish blue |
| 6* | 12 | 2.8 | 50 | 50 | — | darkened and balckened greenish blue |

Note
*outside the scope of the present invention

As is apparent from the results shown in Table 1, samples 2 through 5 had a hue of a basic greenish blue color, which had been blackened and darkened, and had a surface having a good gloss with no voids, and each of these samples had high strength and high toughness.

In sample 1, since the amount of the metal oxide colorant component was too small, desired coloration was impossible. In sample 6, since the amount of the metal oxide colorant component was too large, the strength and toughness were drastically degraded.

EXAMPLE 3

Ceramics molded bodies of samples 7 through 14 shown in Table 2 were prepared in the same manner as described in Example 1 except that the sintering temperature, pressure, HIP retention time and carbon source at the second sintering were changed to change the ZrC content as shown in Table 2. The obtained results are shown in Table 2.

Moreover, by the process for preparing colored zirconia ceramics according to the present invention, a colored article having high strength and high toughness

TABLE 2

| Sample No. | ZrC (% by weight) | Ratio (mole %) of Tetragonal Crystals in $ZrO_2$ | Strength (kg/cm$^2$) | Toughness (MN/m$^{3/2}$) | Hue |
| --- | --- | --- | --- | --- | --- |
| 7 | 0.1 | 85 | 125 | 14.1 | thinly blackened greenish blue |
| 8 | 0.4 | 82 | 125 | 14.0 | blackened and darkened greenish blue |
| 9 | 1.1 | 84 | 125 | 14.1 | blackened and darkened greenish blue |
| 10 | 6.4 | 81 | 125 | 14.2 | blackened and darkened greenish blue |
| 11 | 11.0 | 80 | 123 | 13.8 | blackened and darkened greenish blue |
| 12 | 13.2 | 75 | 110 | 13.1 | blackened and darkened greenish blue |
| 13* | 17.3 | 58 | 82 | 8.5 | blackened and darkened greenish blue |
| 14* | 38.5 | 46 | 42 | 5.3 | blackened and darkened greenish blue |

Note
*outside the scope of the present invention

As is apparent from the results shown in Table 2, samples 8 through 12 had a hue of a greenish blue color, as the base color, which had been blackened and darkened and a surface having a good gloss with no voids, and each of these samples had high strength and high toughness.

In samples 13 and 14, since the ZrC content was too high, the strength and toughness were drastically degraded.

As is apparent from the foregoing description, the colored zirconia ceramics of the present invention has high strength and high toughness characteristics, and a desired darkened color hue can be obtained by the metal oxide colorant component and ZrC.

Moreover, when the surface of the colored zirconia ceramics of the present invention is polished, a mirror surface having a deep gloss can be obtained and the polished ceramics can be used for various decorative articles, for example, a watch case, a dial plate, a tie pin, a buckler, a bracelet, a ring, a button, a pendant, a spike and the like.

The colored zirconia ceramics of the present invention has high strength and high toughness characteristics and can be colored in a metallic hue, and therefore, the colored ceramics of the present invention can be used as various metal substitutes, for example, daily goods such as blades and knives, industrial structural members and machine parts.

characteristics can be provided, and uneven coloration is prevented and the yield is increased. Therefore, colored zirconia ceramics having high quality and high reliability can be provided at a low manufacturing cost.

I claim:

1. A process for the preparation of colored, partially stabilized zirconia ceramics, which comprises molding a composition comprising 0.1 to 10 parts by weight of a colorant component and 90 to 99.9 parts by weight of zirconia and a stabilizer into a molded body sintering the molded body, and sintering the obtained sintered body in a carbon atmosphere to form ceramics containing 0.05 to 15% by weight of zirconium carbide, in which the crystal phase of zirconia is composed of tetragonal crystals.

2. A process according to claim 1, wherein sintering of the molded body is carried out at a temperature of 1200° to 1700° C. and sintering of the sintered body is carried out at a temperature of 1100° to 1650° C.

3. A process according to claim 1, wherein the colorant component is a metal oxide having an average particle size smaller than 0.06 μm and the zirconia has an average particle size smaller than 0.15 μm.

4. A process according to claim 1, wherein the stabilizer is yttria and is contained in an amount of 2 to 7 mole % based on the composition.

5. A process according to claim 1, wherein the stabilizer is calcia or magnesia and is contained in an amount of 7 to 13 mole % based on the composition.

* * * * *